United States Patent [19]

Sannholm

[11] Patent Number: 4,979,965
[45] Date of Patent: Dec. 25, 1990

[54] METHOD OF DEHUMIDIFYING GASES

[75] Inventor: Krister Sannholm, Espoo, Finland

[73] Assignee: Ahlströmföretagen Svenska AB, Norrköping, Sweden

[21] Appl. No.: 380,894

[22] Filed: Jul. 14, 1989

[30] Foreign Application Priority Data

Aug. 1, 1988 [SE] Sweden .............................. 8802781-8

[51] Int. Cl.$^5$ ............................................. B01D 53/02
[52] U.S. Cl. .......................................... 55/32; 62/112
[58] Field of Search ...................... 55/29–32; 62/112

[56] References Cited

U.S. PATENT DOCUMENTS

| 1,740,248 | 12/1929 | Klaiber ..................................... 55/31 |
| 1,791,086 | 2/1931 | Sperr ........................................ 55/30 |
| 1,919,781 | 7/1933 | Forrest et al. ........................... 55/32 |
| 2,279,938 | 4/1942 | Crawford ................................. 55/31 |
| 2,280,633 | 4/1942 | Crawford ................................. 55/31 |
| 4,860,548 | 8/1989 | Ryham ..................................... 62/112 |
| 4,864,830 | 9/1989 | Ryham ..................................... 62/112 |

FOREIGN PATENT DOCUMENTS

| 79029799 | 5/1982 | Sweden . |
| 2042713 | 9/1980 | United Kingdom ..................... 55/31 |
| WO89/04713 | 6/1989 | World Int. Prop. O. ............... 55/32 |

Primary Examiner—Bernard Nozick
Attorney, Agent, or Firm—Cohen, Pontani & Lieberman

[57] ABSTRACT

A method of dehumidifying gas in which gas is brought into direct contact with an absorption liquid in one or more stages, and in which the absorption liquid in at least one stage comprises a salt solution which includes an amount of salt crystals so that the concentration of the salt solution will not be substantially reduced in the absorption stage.

8 Claims, 2 Drawing Sheets

METHOD OF DEHUMIDIFYING GASES

FIELD OF THE INVENTION

The present invention relates to a method of dehumidifying gases at one or more stages by means of an absorption liquid which is brought into contact with the gas and which consists of a solution of one or more salts in the liquid condensing during the absorption.

BACKGROUND OF THE INVENTION

The Swedish printed application No. 7902979-9 discloses a method of absorbing vapor from a gas, whereby the gas is subjected in a counter flow to an adiabatic absorption effect by a liquid which, as the only volatile component, includes the material which condenses in the absorption and also other non-volatile components having the characteristic, at high concentrations, of substantially reducing the vapor pressure of the volatile material over the liquid. If the absorption liquid is an aqueous solution, then, for example, potassium acetate, sodium acetate, potassium carbonate, calcium chloride, lithium chloride or lithium bromide can be used.

A disadvantage of the described absorption method is that the concentration of the absorption liquid decreases because it is continuously diluted due to the vapor absorption, resulting in an increase of the vapor pressure of the volatile component over the liquid. When the concentration of the salt solution has decreased to a certain level at which the equilibrium prevails between the partial pressure of the vapor in the gas and the partial pressure of the liquid over the solution, the vapor absorption will stop. To a certain extent this can be advantageously affected by using large amounts of absorption liquid or a large number of absorption stages, but it has a negative effect on the heat and the total economy of the system. In order to avoid said negative effect the gas is dehumidified to such humidity content as to be in equilibrium with the diluted absorption liquid.

SUMMARY OF THE INVENTION

The main object of the present invention is the dehumidification of the gas to a low relative humidity.

Another object of the present invention is the dehumidification of the gas to a low relative humidity by using only one absorption stage.

Yet another object is the dehumidification of the gas to a low relative humidity with a low specific energy consumption.

The method in accordance with the invention is characterized in that, in at least one absorption stage the gas is brought into direct contact with a liquid comprising a saturated salt solution including crystals of said salt solution. Thus the solution in said absorption stage is saturated during the entire absorption process and the partial pressure of the liquid over the solution is constant during the process due to the presence of crystals in the solution. The salt solution can be introduced for contact with the gas upstream, cross stream or down stream relative to the gas.

Saturated salt solutions including salt crystals have previously been utilized in an absorption heat pump system described in U.S. Pat. specification No. 4,413,480. The salt solution in this system absorbs vapor which is produced by a pressure decrease of the circulating liquid which is utilized as an indirect heat exchange medium in a closed system. In the method in accordance with the present invention, however, the saturated salt solution is brought into direct contact with a gas for dehumidifying the gas in an open system. The invention is thus considered to be an improvement of the method described in SE No. 7902979-9.

The method in accordance with the invention is applied to the absorption of water vapor from air, wherein the absorption liquid is an aqueous solution, but it may also be applied to other vapors and gases. The choice of the absorption liquid is naturally dependent on the vapor being absorbed.

BRIEF DESCRIPTION OF THE DRAWINGS

The present invention is described more in detail, by way of example, with reference to the accompanying drawings, in which.

DETAILED DESCRIPTION OF THE PRESENTLY PREFERRED EMBODIMENTS

Figure 1:
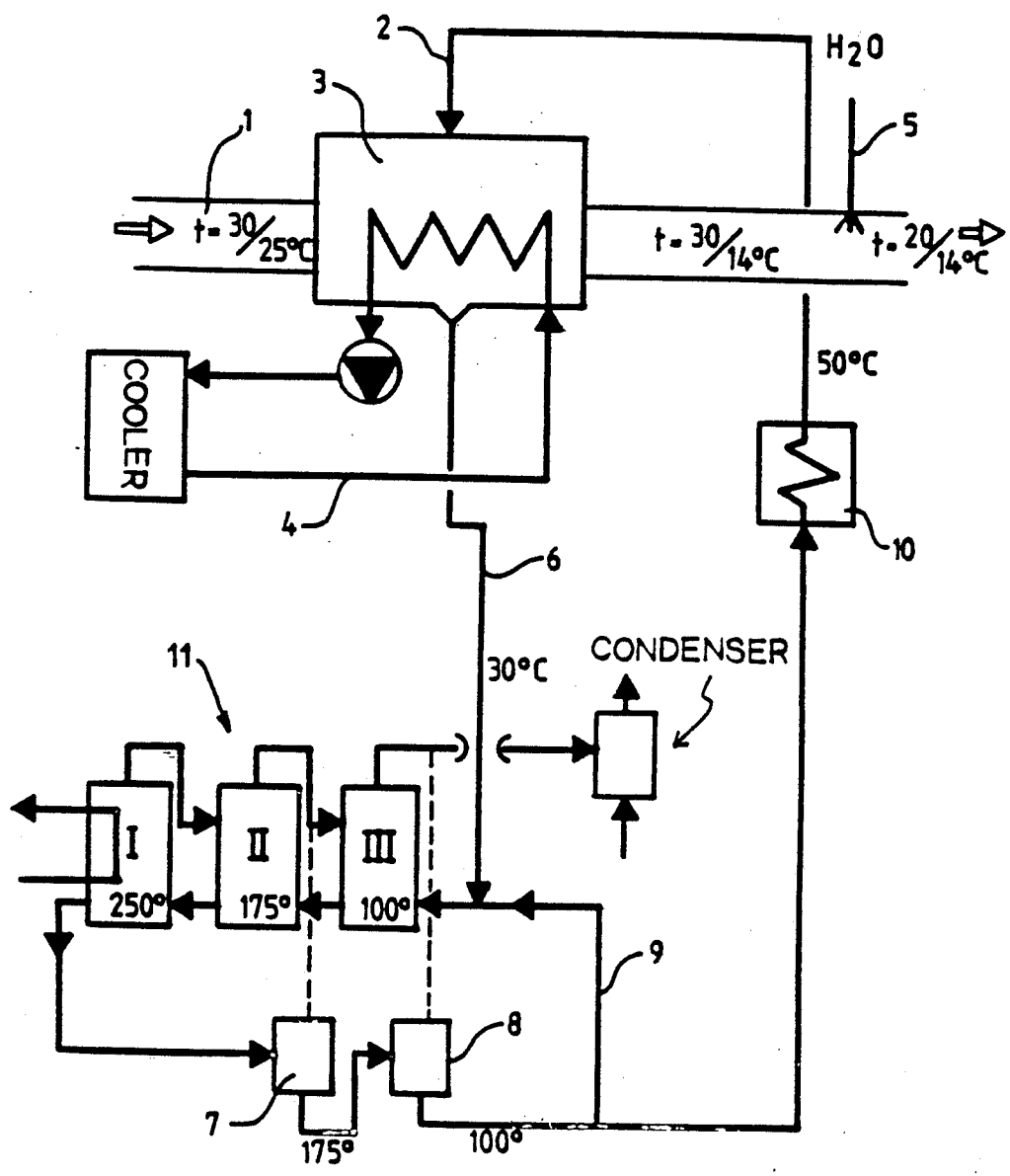
FIG. 1 is a schematic flow-diagram illustration of an embodiment, in which the invention is applied to an air conditioning system.

In the embodiment shown in FIG. 1, warm and humid air flowing through a pipe 1 is brought into direct contact with an absorption medium including salt crystals which is supplied through a pipe 2 to an absorption device 3. The air is indirectly cooled by the absorption liquid by means of a cooling liquid circulating in a closed circuit system 4. For adjusting the temperature and the relative humidity of the outflowing air, the air which is first dehumidified in the absorption device, is rehumidified by injecting water, which is supplied through a pipe 5, whereby the air at the same time is cooled by evaporating the water.

The absorption liquid, the crystals of which have either totally or partially melted during the vapor absorption, is discharged from the absorption apparatus and conveyed through a pipe 6 to a multi-effect evaporation apparatus 11, in which water is evaporated from the absorption liquid through evaporation in a manner known per se. The regenerated absorption liquid leaving the evaporation stage I at a high temperature and high salt concentration, is subjected to a pressure decrease in two stages in expansion vessels 7 and 8, whereby the temperature of the absorption liquid decreases and salt crystals separate from the solution. The expansion vapor is conveyed to the evaporation device. Salt solution is separated and recirculated through a pipe 9 to the evaporation device. Most of the salt crystals possibly together with the salt solution are conveyed via a cooler 10 to absorption apparatus 3.

The embodiment in accordance with FIG. 1 is typically applied to treat air having the temperature of about $t=30°$ C. and the relative humidity of about $\rho=70\%$. The air being discharged from the absorption apparatus at about $t=30°$ C. and about $\rho=15\%$ is rehumidified and cooled to about $t=20°$ C. The crystals of the aqueous solution of the potassium acetate are fed into absorption device 3 to such an extent that the salt crystals are mainly consumed but that the salt solution concentration in the absorption apparatus does not charge to any appreciable extent, and therefore the absorption liquid being discharged from the absorption apparatus mainly consists of saturated solution of the respective salt.

The salt solution is regenerated in a three-stage-evaporator 11, wherein the absorption liquid leaving the evaporation stage I has a temperature of about 250° C. After expansion in two stages 7, 8, the temperature is reduced to about 100° C. The salt crystals and the salt solution which is conveyed to the absorption apparatus 3, are cooled to a temperature of max. about 50° C.

The heat, which is released by the absorption of water vapor in the absorption apparatus 3 is discharged by means of cooling circuit 4 so that the absorption carried out is substantially isothermal.

Figure 2:
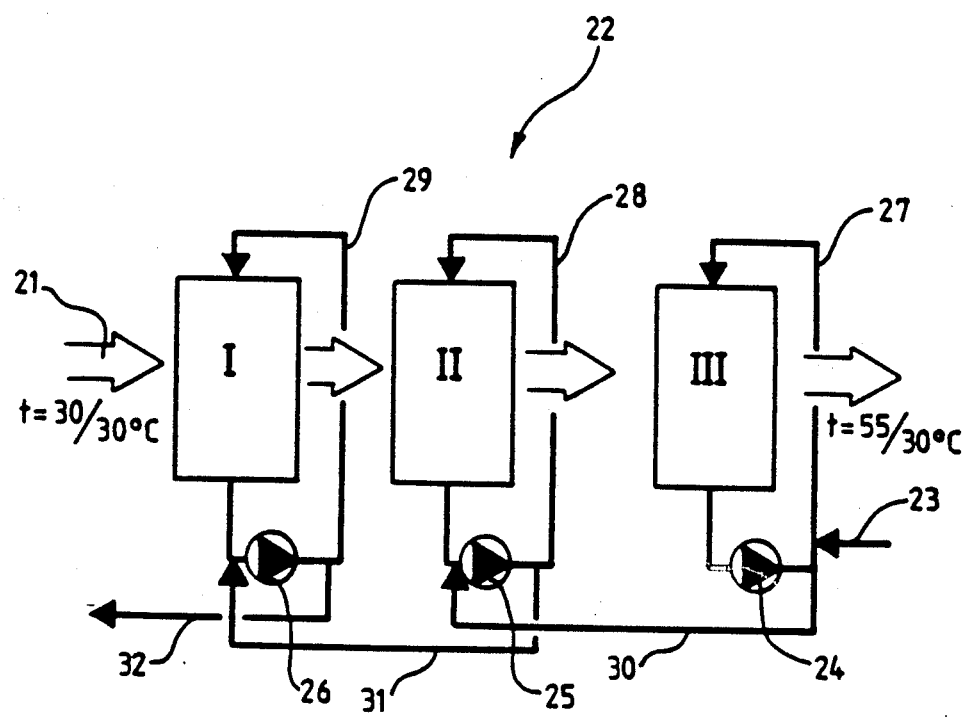
FIG. 2 is a schematic flow-diagram illustration of an embodiment, in which the invention is applied to a drying system.

In the embodiment shown in FIG. 2, humid air 21 is conveyed from a drying apparatus through a three stage absorption apparatus 22 in counter current against absorption liquid, which is fed through a pipe 23 to the last absorption stage III in the form of saturated salt solution including crystals of the same salt or merely in the form of salt crystals. The absorption liquid is circulated in the absorption stages by means of pumps 24, 25 and 26 and circulation conduits 27, 28 and 29. Absorption liquid is conveyed from stage III to stage II through conduit 30, from stage II to stage I through conduit 31 and from stage I to an evaporator (not shown) through conduit 32 to be concentrated and crystallized therein.

The embodiment in accordance with FIG. 2 is typically applied to treat exhaust air from a drying process at a temperature of about $t = 30°$ C. and at a relative humidity of about $\rho = 100\%$. Due to the vapor absorption the air is concurrently dehumidified and heated to a temperature of about $t = 55°$ C. and a relative humidity of about $\rho = 15\%$ by bringing the air in the last absorption stage III into direct contact with an absorption liquid including an amount of salt crystals so that the absorption liquid which is leaving the absorption stage, eventually consists of a saturated solution. In the following absorption stage II, the solution is diluted and it is further diluted in the third stage. The diluted liquid is regenerated and recirculated to the absorption apparatus. The dehumidified air, the temperature of which has been increased by the heat released in the vapor absorption, is reused for drying.

It is understood that the described embodiments are not intended to restrict the scope of the present invention from what is defined in the accompanying claims. Therefore, it is possible, for example, in a multi-stage absorption apparatus to feed absorption liquid including salt crystals to one of the stages and to evaporate and crystallize said absorption liquid separately from the absorption liquid which is fed to the other stages. It is evident to those skilled in the art that the evaporation does not necessarily have to be carried out in three stages. The crystallization process can be brought about by cooling by means of the heat exchange. The temperature of the dehumidified air can be adjusted by indirect cooling or by cooling with an absorption liquid.

What is claimed is:

1. A method of dehumidifying gas in one or more absorption stages comprising:
   directly contacting said gas in at least one absorption stage with a saturated hygroscopic salt solution including crystals of said salt serving as an absorption liquid, said crystals being present in an amount sufficient so that the concentration of said salt solution will not substantially decrease during the contacting step in said absorption stage to obtain a saturated absorption liquid; regenerating said absorption liquid to further concentrate said absorption liquid; and recycling said absorption liquid to said absorption stage wherein the hygroscopic salt crystals are mainly consumed.

2. The method in accordance with claim 1 wherein said absorption liquid substantially comprises salt crystals.

3. The method in accordance with claim 1, additionally comprising the step of adjusting the humidity content and the temperature of said dehumidified gas by injecting water into said gas after said absorption stage.

4. The method in accordance with claim 1, wherein said absorption liquid including salt crystals is fed to one of the stages of a multi-stage absorption apparatus; and additionally comprising the following steps:
   evaporating and crystallizing said absorption liquid including salt crystals separately from absorption solution subsequently fed to said other stages.

5. The method in accordance with claim 1, wherein said gas is air and said absorption liquid comprises an aqueous solution of one or more salts.

6. The method in accordance with claim 5, wherein the absorption liquid is an aqueous solution of potassium acetate.

7. The method in accordance with claim 1, additionally comprising adjusting the temperature of said dehumidified gas by indirectly cooling said gas.

8. The method in accordance with claim 7, wherein the temperature of said dehumidified gas is adjusted by cooling said absorption liquid.

* * * * *